United States Patent
Geerlings et al.

(10) Patent No.: US 10,131,016 B1
(45) Date of Patent: Nov. 20, 2018

(54) LASER SYSTEM AND PROCESS WITH BUFFER MATERIAL

(71) Applicant: GENTEX CORPORATION, Zeeland, MI (US)

(72) Inventors: Kurtis L. Geerlings, Zeeland, MI (US); Donald L. Bareman, Zeeland, MI (US); David J. Cammenga, Zeeland, MI (US); Niels A. Olesen, Zeeland, MI (US); Henry A. Luten, Holland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 254 days.

(21) Appl. No.: 14/826,993

(22) Filed: Aug. 14, 2015

Related U.S. Application Data

(60) Provisional application No. 62/037,341, filed on Aug. 14, 2014.

(51) Int. Cl.
    *G02F 1/15* (2006.01)
    *B23K 26/00* (2014.01)
    (Continued)

(52) U.S. Cl.
    CPC ...... *B23K 26/0039* (2013.01); *B23K 26/0054* (2013.01); *C03B 33/102* (2013.01); *G02B 5/08* (2013.01)

(58) Field of Classification Search
    CPC .......... B23K 26/0054; B23K 26/0057; B23K 26/0063; B23K 26/06; B23K 26/02; B23K 26/0093; B23K 26/10; B23K 26/123; B23K 26/125; B23K 26/1462; B23K 26/142; B23K 26/146; B23K 26/032; B23K 26/0635; B23K 26/0732; B23K 26/147; B23K 26/1476; B23K 26/16; B23K 26/0624; B23K 26/066; B23K 26/40; B23K 26/361; C03B 33/102; C03B 33/091; C03B 33/082; C03B 33/0855; C03B 33/0955; G02B 5/08; G02B 6/02147; B41J 2/1603;
    (Continued)

(56) References Cited

U.S. PATENT DOCUMENTS

| | | | |
|---|---|---|---|
| 8,842,358 B2 | 9/2014 | Bareman et al. | |
| 2002/0190435 A1* | 12/2002 | O'Brien | B23K 26/032 264/400 |

(Continued)

*Primary Examiner* — Mustak Choudhury
(74) *Attorney, Agent, or Firm* — Foley & Lardner LLP; Bradley D. Johnson

(57) ABSTRACT

A laser system includes a buffer material at an entry surface of a substrate in which laser-induced channels are formed. The laser beam propagates through the buffer material and impinges the substrate with a central axis of the laser beam at an oblique angle of incidence. The buffer material has a refractive index that may be closer to that of the substrate than is the refractive index of the atmosphere, such as air, in which the laser system operates. The buffer material facilitates forming laser-induced channels at relative large angles with respect to the substrate surface by attenuating energy loss or other effects on the laser beam that are normally caused by the mismatch in refractive index between the environment and the substrate in the absence of the buffer material.

15 Claims, 6 Drawing Sheets

(51) Int. Cl.
*C03B 33/10* (2006.01)
*G02B 5/08* (2006.01)

(58) Field of Classification Search
CPC ...... B41J 2/1628; B41J 2/1629; B41J 2/1632; B41J 2/1634
USPC ............... 359/245, 265, 267, 27, 228, 230, 359/290–293, 719, 809; 219/121.69, 219/121.71, 121.67, 121.7, 121.84, 219/121.61, 121.62, 121.68; 264/400; 606/11; 623/1.15, 23.7, 901
See application file for complete search history.

(56) References Cited

U.S. PATENT DOCUMENTS

| | | | |
|---|---|---|---|
| 2003/0127441 A1* | 7/2003 | Haight | B23K 26/032 219/121.84 |
| 2005/0131522 A1* | 6/2005 | Stinson | A61F 2/91 623/1.15 |
| 2005/0173388 A1* | 8/2005 | Lavers | B23H 9/10 219/121.71 |
| 2014/0036338 A1* | 2/2014 | Bareman | G02F 1/157 359/267 |

\* cited by examiner

LASER SYSTEM AND PROCESS WITH BUFFER MATERIAL

TECHNICAL FIELD

The present disclosure generally relates to manufacturing processes that use lasers and, more particularly, to processes that use lasers to separate material into two or more separate portions of material.

BACKGROUND

A substrate material can be separated into two or more pieces by forming a plurality of laser-induced channels along a process path located along an intended line of separation, as taught by Bareman et al. in U.S. Pat. No. 8,842,358. A laser-induced channel edge can be formed upon substrate separation and can have a relatively smooth surface without the need for post-processing operations such as grinding.

SUMMARY

In accordance with various embodiments, a laser system includes a laser configured to produce a pulsed laser beam and a laser delivery assembly. The laser delivery assembly directs the pulsed laser beam toward a substrate that is at least partially transparent to the laser beam. The laser system is configured to produce a plurality of laser-induced channels extending at least partially through the thickness of the substrate along a process path defined along an entry surface of the substrate. The laser system further includes a buffer material at the entry surface of the substrate. The laser beam propagates through the buffer material and impinges the substrate with a central axis of the laser beam at an oblique angle of incidence.

In accordance with various embodiments, a product includes a portion of an at least partially transparent substrate. The substrate portion is obtained by separation from the remainder of the substrate along a plurality of laser-induced channels located along a line of separation and extending at least partially through the thickness of the substrate. A separation surface of the substrate portion is defined at least in part by the plurality of laser-induced channels, and the separation surface has a draft angle greater than or equal to 20 degrees.

BRIEF DESCRIPTION OF THE DRAWINGS

Illustrative embodiments will hereinafter be described in conjunction with the appended drawings, wherein like designations denote like elements, and wherein.

DETAILED DESCRIPTION OF ILLUSTRATIVE EMBODIMENTS

Figure 1:
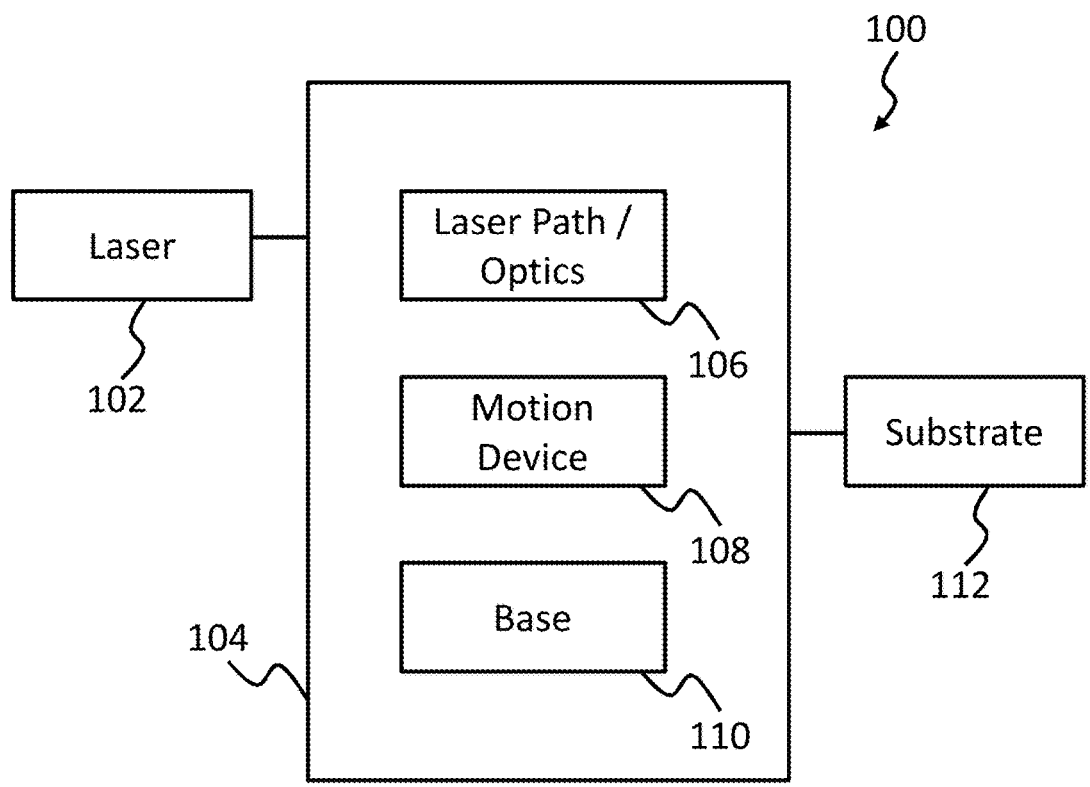
FIG. 1 is a schematic diagram of an illustrative laser system.

With reference to FIG. 1, a laser system 100 is diagrammatically illustrated. The illustrated embodiment includes a laser 102 in optical communication with a laser delivery assembly 104. The laser delivery assembly 104 may include a laser path or optics 106, a laser motion device 108, and a base 110, as shown, and is configured to direct a beam of laser light (i.e., a laser beam) emitted by the laser 102 toward a substrate 112 that is to be processed.

The laser motion device 108 generally operates to change, control, monitor and/or determine the relative location and/or orientation of a portion of the laser beam that impinges the substrate 112 and may do so via appropriate movement of the laser beam and/or the substrate relative to a Cartesian coordinate system and/or about various axes. For instance, the motion device 108 may include servo motors, controllers, sensors, optical elements, and other components configured to change the location and/or orientation at which the laser beam impinges the substrate 112. The motion device 108 may include its own optical elements separate from the laser path or optics 106, which may be arranged between the laser 102 and the motion device.

One process parameter of the laser system 100 that is influenced by the motion device 108 is the speed or velocity at which the laser beam moves with respect to the substrate 112. In some embodiments, the motion device 108 is configured to move the laser beam with respect to the substrate at a constant speed. More particularly, with reference to FIG. 2, the motion device 108 (only a portion of which is illustrated) can be configured to move the laser beam 114 with respect to the substrate 112 so that a laser spot 116 moves along a process path 118 at a constant speed. The laser spot 116 is defined where the laser beam 114 impinges a surface 120 of the substrate 112. Where the substrate 112 is at least partially transparent to the particular wavelength of laser light generated by the laser 102 (e.g., certain glass materials), the impingement surface 120 may be considered an entry surface. As used herein, the speed of the laser spot 116 is the magnitude of the velocity of the laser spot 116 as measured along the process path 118 in the instant direction of movement. In other words, when the laser spot 116 is moving at a constant speed along the process path 118, its velocity may be increasing or decreasing in other directions.

Figure 2:
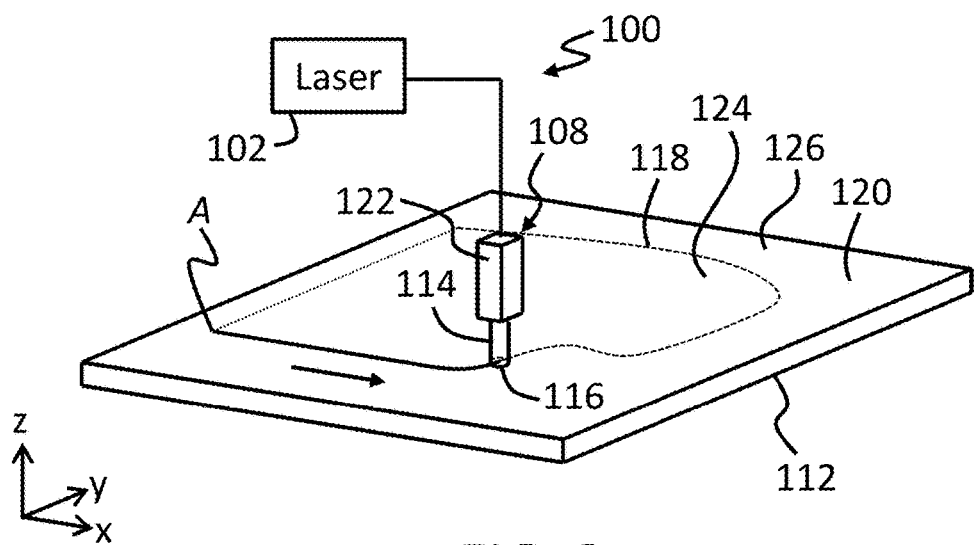
FIG. 2. is a perspective view of an illustrative laser system processing a substrate.

In the example illustrated in FIG. 2, the processed portion of the process path 118 is indicated by a solid line, and the unprocessed portion is indicated by a dotted line. The process starting point is indicated at point A, and the starting direction of movement is in the x-direction. Beginning at point A, the laser spot 116 may move at a constant speed along the process path 118. In this example, this means that the laser spot 116 moves away from point A at the same constant velocity in the x-direction and at a different constant velocity (i.e., zero) in the y-direction. Where the process path 118 of FIG. 2 curves toward the y-direction, the velocity of the laser spot 116 decreases and increases in the respective x- and y-directions while remaining constant in the instant direction of the process path.

Moving the laser beam 114 and laser spot 116 at a constant speed along the process path 118 is advantageous when the laser system 100 is configured to deliver the laser beam to the substrate in pulses at a designated frequency so that the locations at which the laser affects the substrate material are evenly spaced along the process path 118. For instance, with a laser system 100 configured with a pulse frequency of 100 kHz, movement of the laser spot 116 along the process path 118 at a constant speed of 500 mm/sec results in laser pulses delivered to the substrate every 5 μm along the process path 118. Other exemplary speeds are 250 mm/sec and 125 mm/sec, and other exemplary laser pulse frequencies are 200 kHz and 400 kHz. Other laser movement speeds and pulse frequencies are possible, and each can affect the spacing of laser-induced channels or other laser-affected material portions along the process path. It is also possible to vary the speed of the laser spot 116 along the process path 118 and may be possible to change the laser pulse frequency along the process path as well.

In the laser system 100 depicted in FIG. 2, the laser motion device 108 includes an optical assembly 122 through or along which the laser beam 114 travels on its way from the laser 102 to the substrate 112. The motion device 108 may include other non-illustrated components as well, such as a structural portion, a motor portion, and/or other components. The optical assembly 122 includes one or more optical elements. Each optical element is configured to change the direction, size, shape, energy density, energy distribution, or other characteristic of the laser beam 114. Some examples of optical elements include mirrors, reflectors, lenses, magnifiers, diffusers, prisms, and apertures. In some cases, an optical element can provide multiple beam-changing functions. For example, a concave mirror may reflect or change the direction of the laser beam while simultaneously focusing the beam.

Figure 3:
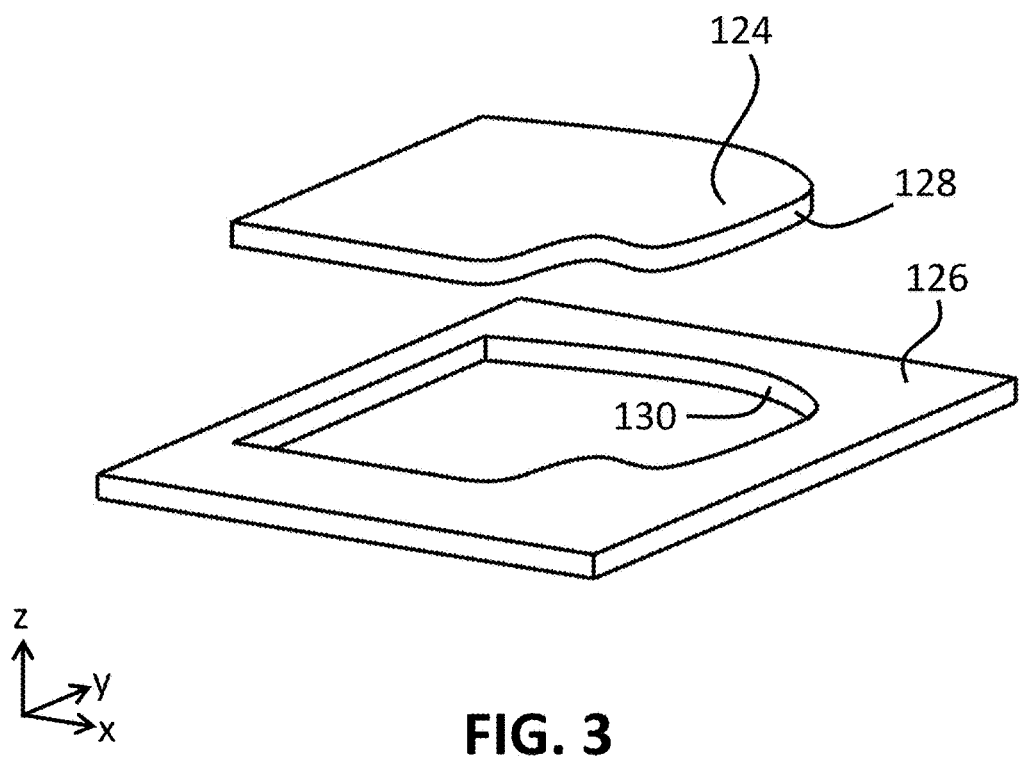
FIG. 3 is a perspective view of first and second portions of the substrate of FIG. 2 after separation.

In embodiments where the substrate 112 is at least partially transparent to the particular wavelength of the laser light from the laser 102, it is possible to form a series of spaced-apart laser-induced channels along the process path 118, with each of the channels extending at least partially through the thickness of the substrate (i.e., in the z-direction of FIG. 2). Laser-induced channels are described in further detail below and are useful to facilitate separation of the substrate 112 into separate portions, such as inner and outer portions 124, 126, along a line of separation defined at least in part by the process path 118. Each laser-induced channel may be characterized by a columnar volume of material within the substrate 112 along which the substrate material has been damaged or otherwise altered. With the application of chemical processes, physical stress, thermal stress, time, or a combination thereof, cracks, (e.g., microcracks) may form between adjacent laser-induced channels along most or all of the length of the process path 118, and the substrate may be severed or separated into two separate portions 124, 126, as shown in FIG. 3. In this example, the process path 118 is a closed path located within the perimeter or boundaries of the starting substrate 112. In other examples, the process path 118 and resulting line of separation extend to at least one edge of the substrate 112.

When portions 124, 126 are initially separated, opposing surfaces or edges 128, 130 are formed along each of the respective separate portions. Each of the newly formed surfaces 128, 130 may be referred to as a separation surface. When separated along a series of laser-induced channels, the newly formed edges 128, 130 may be relatively smooth and absent sharp features, without the need for post-processing such as grinding, even with substrates such as glass, with which grinding of the edges is typically required to remove sharp edges after traditional separation techniques like mechanical scribing. Another characteristic of this type of material separation or singulation is that it is essentially a zero-kerf separation technique. In other words, in contrast to most other laser scribing, cutting, or ablation processes, the laser-induced channel separation process does not remove any measurable amount substrate material—e.g., the outer perimeter of inner portion 124 and the inner perimeter of outer portion 126 are the same size and shape.

Figure 4:
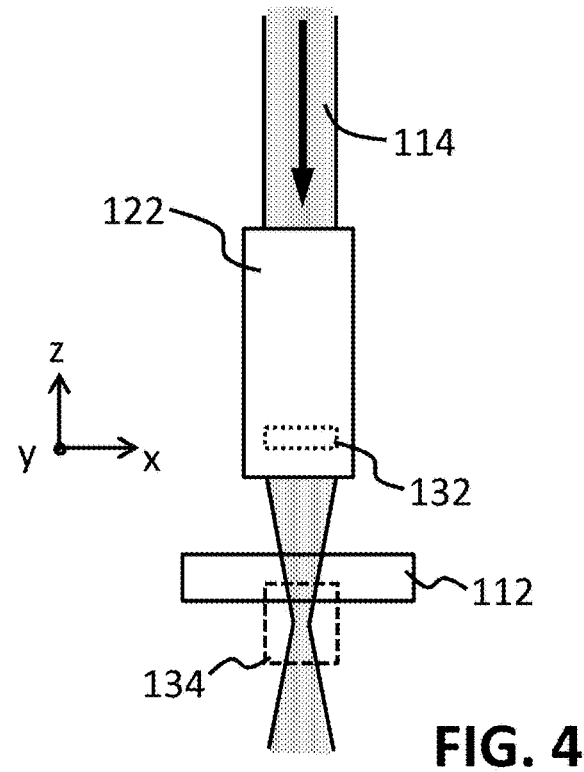
FIG. 4 is a schematic view of a portion of an illustrative laser system, including an optical element.
Figure 5:
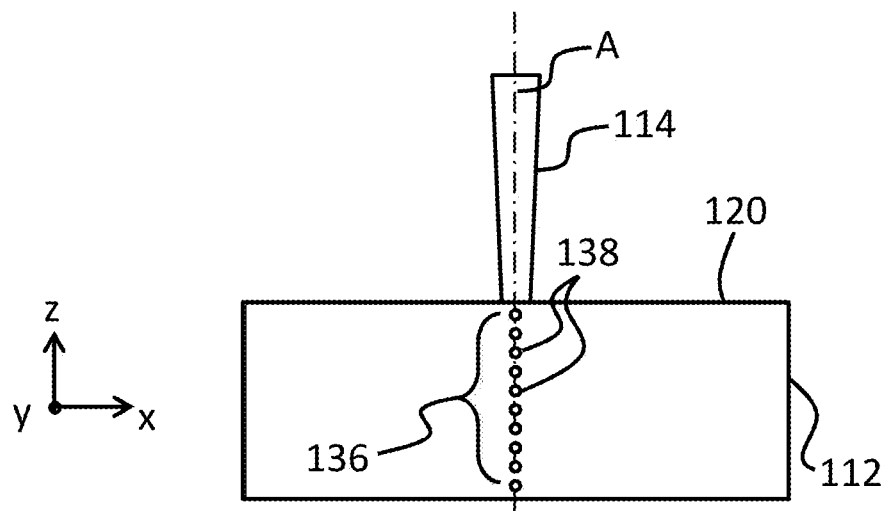
FIG. 5 is a side view of a laser beam forming a laser-induced channel in a substrate.

A brief description of the manner in which laser-induced channels can be formed in a transparent or partially transparent substrate is provided with reference to FIGS. 4 and 5. In the example of FIG. 4, the optical assembly 122 of the laser system includes optical element 132. The optical assembly 122 is configured to receive the laser beam 114, alter a characteristic of the laser beam, and emit the altered laser beam in a direction of light propagation (parallel with the z-axis in this example), such as toward the substrate 112. In the example of FIG. 4, the optical assembly 122 includes a focusing optical element 132, such as a lens, that narrows the laser beam 114, thereby increasing the power density of the laser beam in the z-direction for some distance beyond the optical assembly 122. The power density referred to here is the average power per unit area, where the area is the cross-sectional area of the beam measured in a plane perpendicular with the direction of light propagation (i.e., the x-y plane in FIG. 4). Without the substrate 112 in the path of the laser beam 114, the power density of the beam reaches a maximum along the z-direction in a nominal or geometric focal region 134, beyond which the power density of the beam decreases as the beam diverges or diffuses. As used herein, the terms "power" and "energy" may be used somewhat interchangeably, as skilled artisans will understand that the two terms are related by time or duration. For instance, the energy available from a laser beam of a particular power or wattage within a particular amount of time is generally the product of the laser power and the time. Thus, a timed pulse of laser energy of a known power has an associated amount of available energy.

The energy in a pulse of the laser beam 114 also has a distribution along the direction of light propagation that is a function of distance in the direction of light propagation. In other words, the total amount of energy in a laser pulse of a particular duration propagates through the optical assembly 122 and is distributed at various distances from the last optical element the beam encounters and in various corresponding amounts at each distance. This energy distribution is referred to herein as the focal energy distribution. As used here, a laser pulse refers to both a single, uninterrupted pulse and to a rapid burst of pulses. For instance, a laser operating at a pulse frequency of 100 kHz may deliver a particular amount of energy (i.e., the product of the laser power and total pulse time) 100,000 times per second—i.e., once every 10 μs. Depending on the amount of energy delivered every 10 μs, it may be delivered in a single uninterrupted pulse or in a plurality of pulses on the nanosecond scale.

Where the substrate 112 is at least partially transparent to the particular wavelength of laser light, self-focusing of the light beam can occur due to the Kerr effect. Generally, the Kerr effect is the change in the refractive index of a material in response to an electric field. The optical Kerr effect is the case in which the electric field is due to the light itself. In such cases, the index of refraction of the material increases as a function of increasing light intensity. As the refractive index increases, the beam of light is focused further due to the differential increase in index in the center of the beam. This focusing, called self-focusing, causes a further increase in the intensity, and a corresponding further increase in the index of refraction. In a scenario in which this self-focus process is not limited by another process, the beam of light may cause a catastrophic self-focus event in which an internal volume of the substrate is damaged once a certain intensity threshold is reached. The threshold may be specific to the material composition, and the intensity may be a particular amount of energy per unit mass or volume. Thus, placing a Kerr material in the path of the beam 114 alters the focal energy distribution of the beam away from the nominal condition due to both its linear index of refraction and its non-linear effects.

When the focal energy distribution of the beam is such that the damage threshold of the substrate material is reached at a distance from the final optic that is within the thickness of the substrate, an array of one or more self-focus damage volumes is formed approximately along a line and about an axis in the direction of light propagation (z-direction in FIG. 4). This array of one or more self-focus damage volumes is referred to as a laser-induced damage channel or a laser-induced channel. In some cases, the array of damage volumes is sufficiently large in number and/or the individual damage volumes of the array are sufficiently large in size that the resulting laser-induced channel extends through the entire thickness of the substrate. The spacing between individual damage volumes and/or the size of the individual damage volumes along a particular laser-induced channel may be related to the focal energy distribution. For instance, as the energy density along a focal region decreases, the damage spots that make up the laser-induced channel can have a lower apparent presence (e.g., smaller, spaced farther apart, present over a smaller portion of the substrate thickness, and/or less visible). As the energy density along a focal region increases, the damage spots of the laser-induced channel can have a greater apparent presence (e.g., larger, spaced closer together, present over a larger portion of the substrate thickness and/or more visible). As used here, a focal region is defined between two planes spaced different distances from the final optical element. The focal region may be located generally along the line of light propagation, but the light may be focused along a focal path that deviates from the line of light propagation or the direction of light propagation. The laser-induced channel need not be perpendicular to the surface plane of the optical element nor parallel to the line of light propagation.

FIG. 5 depicts an example of a laser-induced channel 136 comprising a plurality of self-focus damage volumes 138 extending through the thickness of a Kerr material substrate 112. In this particular example, the damage volumes 138 are spaced uniformly in the direction of the material thickness. In other examples, the damage volumes 138 can be spaced non-uniformly in the direction of material thickness or can be arranged as a plurality of uniformly spaced groups of damages. For instance, the laser optics can be customized or otherwise configured to provide a uniform focal energy distribution at the desired portion of the substrate thickness. Linear ray tracing or non-linear ray tracing can be used to design the laser optics to distribute the available energy in any desired manner to produce damage volumes distributed as desired, whether uniformly, non-uniformly, only partially through the thickness of the substrate, at or away from the entry and/or exit surfaces of the substrate, etc. The size of the individual self-focus damage volumes 138 can be affected or controlled as well, such as by increasing the power in a particular laser pulse to increase the size of the damage volumes or decreasing the power to decrease the size of the damage volumes. The radial size or effective diameter (i.e., width in the x and/or y direction in FIG. 5) of each laser-induced channel can be affected by affecting the size of the damage volumes.

The laser system is configured to deliver the laser beam 114 to the substrate 112 at an angle of incidence. The angle of incidence is the angle between a central axis A of the laser beam 114 and a surface normal of the impingement surface 120. For example, where the laser beam 114 impinges the substrate surface 120 at a right angle, as shown in FIG. 5, the angle of incidence is zero. A zero angle of incidence can result in separation surfaces that are normal to the substrate surface 120.

Figure 6:
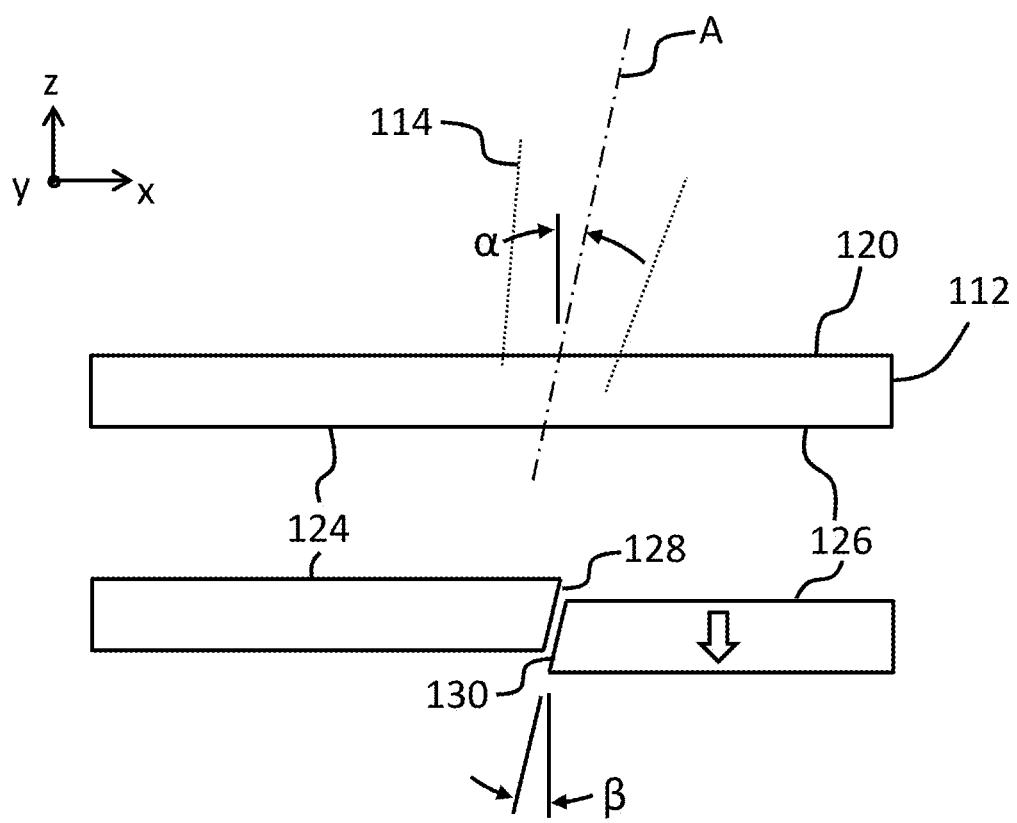
FIG. 6 is a side view of a laser beam impinging a substrate at an oblique angle.

Additionally or alternatively, the laser system can be configured to deliver the laser beam 114 to the substrate 112 at a non-zero or oblique angle of incidence $\alpha$, as illustrated in FIG. 6. A non-zero angle of incidence can result in separation surfaces 128, 130 with a draft angle $\beta$ that can facilitate separation of one portion of the substrate from another. A draft angle is useful to aid separation of first and second substrate portions 124, 126 when the process path 118 lies entirely within the substrate 112 as in FIG. 2 (i.e., the process path does not extend to the edges of the substrate being processed), particularly when the substrate and/or the circumscribed substrate portion (portion 124 in FIG. 2) are relatively small—less than 25 mm, for example. Such a draft angle is also particularly useful in zero-kerf material separation processes in which essentially no material is removed such that the shape and dimensions of the outer perimeter of the first portion 124 is identical to those of the inner perimeter of the second portion 126 at the substrate surface 120. Formation of a series of spaced apart laser-induced channels through the thickness of the substrate 112 along the process path 118 defines a line of separation along which zero-kerf separation can occur. Non-zero angles of incidence may be useful in other laser processes as well, such as traditional laser cutting processes that remove material from the substrate.

The draft angle $\beta$, or the angle of the laser-induced channel with respect to the substrate surface 120, is not necessarily equal to the angle of incidence $\alpha$. For instance, where the substrate 112 is at least partially transparent to the laser light, a change in the index of refraction of the medium through which the laser beam is propagating changes the direction of the beam. Generally, where two materials having indices of refraction $n_1$ and $n_2$ meet at an interface, the direction of light propagation as the light crosses the interface changes from $\theta_1$ to $\theta_2$ according to Snell's law, also referred to as the law of refraction:

$$\frac{\sin\theta_1}{\sin\theta_2} = \frac{n_2}{n_1},$$

where $\theta_1$ and $\theta_2$ are measured with respect to a surface normal of the interface. In an example where the laser beam propagates through air and impinges on a glass substrate ($n_1 < n_2$), the draft angle $\beta = \theta_2$ is less than the angle of incidence $\alpha = \theta_1$. In a specific example, with a borosilicate glass substrate, an angle of incidence of $\alpha = 30°$ produces a draft angle of about $\beta = 20°$.

It has been found that laser-induced channels formed with a laser beam at a non-zero angle of incidence may not include the same size or amount of damage volumes within the substrate as a laser beam at a zero angle of incidence. Stated differently, the focal energy density required to create a laser-induced channel with the same characteristics as those formed at a zero angle of incidence increases as the angle of incidence increases. While the cause of this is not fully understood, it is believed to be due at least in part to an index of refraction mismatch, which may cause energy loss due to reflection or may cause some change to the wavefront of the laser pulse that affects how the light focuses. In other words, more of the light may be reflected away from the surface at higher angles of incidence such that less energy is available within the thickness of the substrate to form the damage volumes of the laser-induced channels, or refraction at the entry surface may introduce a change to the beam shape or linear or non-linear focusing that interferes with the ability of the beam to self-focus at the desired locations. Thus, a laser beam configured to produce a series of laser-induced channels in the substrate sufficient for separation or singulation along the process path at a zero angle of incidence may be unable to produce laser-induced channels of the same sufficiency at a non-zero angle of incidence. The laser-induced channels formed at the non-zero angle of incidence may have a banded structure or too small a number or size of damage volumes, leading to difficulty in substrate separation and/or low quality separation surfaces because of the lower focal energy density.

One solution to the problem of a decreased focal energy density with increased angle of incidence is to increase laser power (energy/pulse), but this has practical limitations depending on the maximum available power of the laser, the capability or energy capacity of the optics, etc. As described below in conjunction with the subsequent figures, a buffer material may be employed to facilitate formation of laser-induced channels at higher angles of incidence, enabling larger draft angles without the need for increased laser power.

Figure 7:
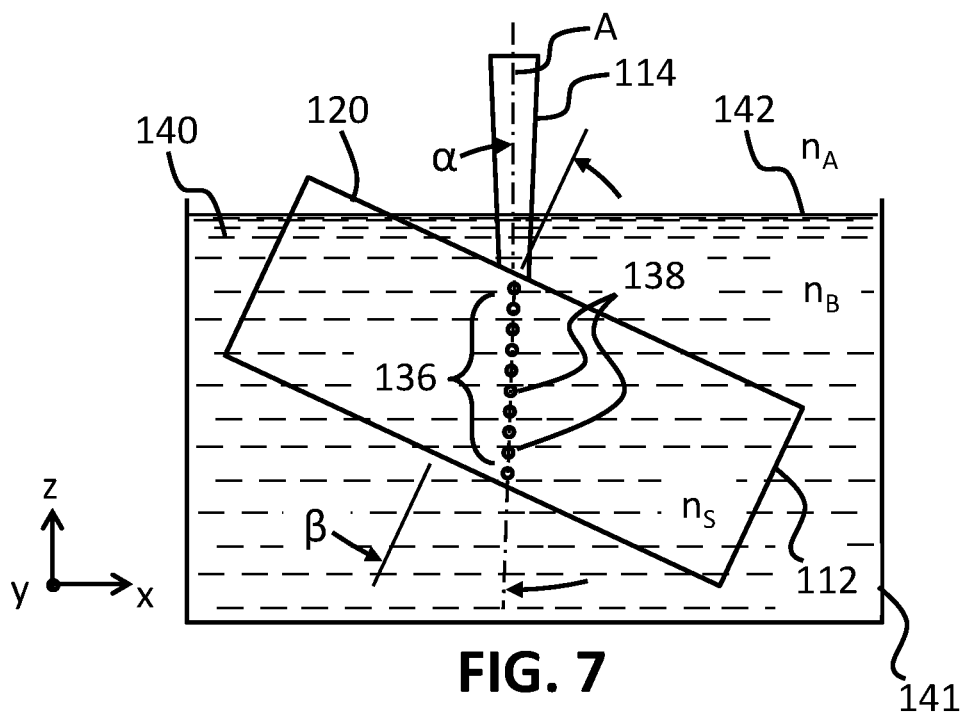
FIG. 7 is a side view of a laser beam impinging a substrate at an oblique angle through a buffer material.

FIG. 7 illustrates one use of a buffer material 140 that can help reduce energy loss at an oblique angle of incidence α. The buffer material 140 is present at the entry surface 120 of the substrate and has a refractive index $n_B$. In the illustrated embodiment, the buffer material 140 is a fluid with a refractive index $n_B$ between the refractive index $n_A$ of the atmosphere through which the laser beam propagates before impinging the buffer material and the refractive index $n_S$ of the substrate 112. ($n_A < n_B < n_S$). The effect of this arrangement is a reduction in the difference between the angle of incidence α and the draft angle β. The laser beam 114 crosses an interface 142 between the atmosphere and the buffer material 140 at a right angle, thus minimizing reflective and/or focusing effect losses at that interface. Reflective and/or focusing effect losses at the entry surface 120 are less than in the example of FIG. 6 because of the reduction in the change in refractive index at the entry surface. Focal energy density is thus preserved to a greater degree, and sufficient laser-induced channels can be formed in the substrate 112 at a larger draft angle β.

In some embodiments, the refractive index $n_B$ of the buffer material 140 is closer to the refractive index $n_S$ of the substrate 112 than it is to the refractive index $n_A$ of the atmosphere. Stated differently the difference between the refractive index of the buffer material and the refractive index of the substrate is less than the difference between the refractive index of the substrate and the refractive index of the atmosphere in which the laser system operates: $(n_S - n_B) < (n_B - n_A)$. In some embodiments, the refractive index of the buffer material is within 20% of the refractive index of the substrate, such that the difference between the two indices is less than or equal to 20% of the refractive index of the substrate. In other examples, the difference between the respective refractive indices of the buffer material and the substrate is less than or equal to 10% or less than or equal to 5%. In some cases the refractive index of the buffer material is substantially equal to that of the substrate.

The closer the refractive index of the buffer material 140 is to that of the substrate 112, the further the energy losses or other focusing effects are minimized, enabling even higher draft angles. In such an arrangement, the change in refractive index is highest at the interface 142 between the atmosphere and the buffer material 140, where the light crosses the interface at a right angle, and the refractive indices are most closely matched at the entry surface 120 of the substrate at the desired angle of incidence α. In one example, the buffer material 140 is a liquid with a refractive index closer to that of the substrate 112 than to the atmosphere. In a particular example, the buffer material is water ($n_B \approx 1.33$), the substrate is soda-lime glass ($n_S \approx 1.46$), and the atmosphere is air ($n_A \approx 1.0$). It has been found that this particular arrangement can produce laser-induced channels at an angle of at least 30° (β≥30°) with the same laser power profile and optics that are limited to β≤10° without the water buffer material. It is possible to match the index of a liquid buffer material with that of the substrate, such as by adding a higher index liquid to water, in the case of a glass substrate, thereby enabling even higher draft angles. Other buffer materials, substrates, and atmospheres are contemplated.

In the arrangement of FIG. 7 the substrate 112 may be supported in a manner that tilts the substrate in various directions to achieve a constant or otherwise controllable angle of incidence α along non-linear process paths and in a manner that maintains a constant or otherwise controllable distance between the laser optics and the entry surface 120.

Figure 8:
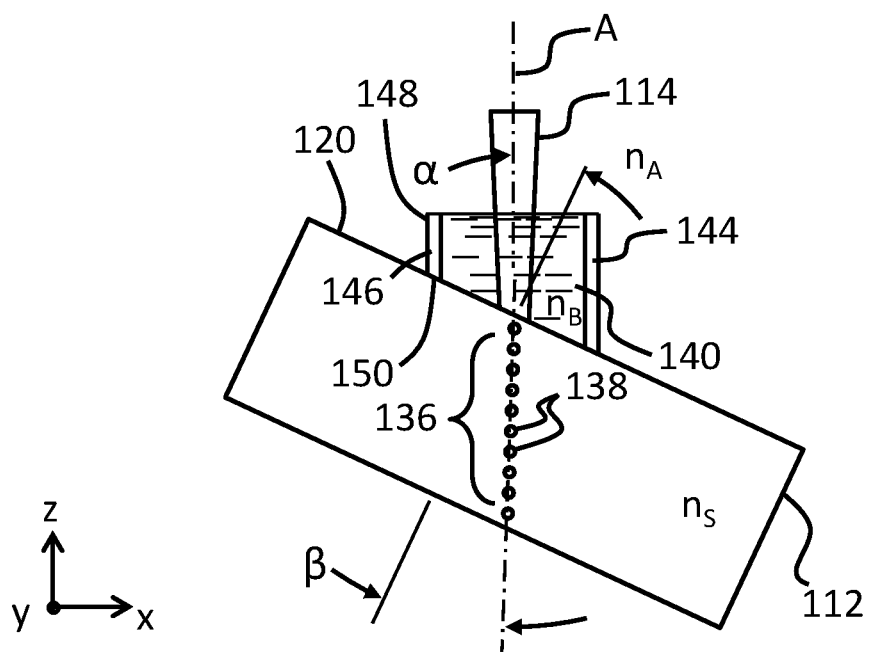
FIG. 8 is a side view of a laser beam impinging a substrate at an oblique angle through a nozzle containing a buffer material.

FIG. 8 illustrates another example in which the buffer material 140 is locally provided at the entry surface 120 of the substrate at and around the laser spot 116 (see FIG. 2). Rather than having the substrate 112 partially or fully immersed in a reservoir 141 of the buffer material 140 as in FIG. 7, the buffer material 140 may be provided via a nozzle 144 configured to move along the process path with the laser beam 114. This configuration may require less buffer material and lessen buffer material movement, which may affect the interface 142. The illustrated nozzle includes a housing 146, and opposite entry and exit ends 148, 150 for the laser beam 114. In some embodiments, the nozzle 144 may be considered an optical element of the laser system, as described above, as it is configured to predictably change the angle of propagation of the laser beam at the entry surface 120 of the substrate 112—not necessarily by its shape, size, or energy distribution alteration; rather by buffer material composition. In one embodiment, the nozzle 144 is an optical element that comprises a fluid, such as a liquid buffer material.

The exit end 150 may include a seal configured to contain the buffer material 140 without leakage or with controlled leakage. A low friction material such as PTFE or other fluoropolymer may be used for such a seal and/or the housing 146 may be entirely constructed from the seal material. The laser beam 114 crosses the interfaces 142 and 120 in substantially the same manner as in FIG. 7. In some embodiments, an optically transparent window is included at the entry end 148 of the nozzle 144. The nozzle 144 may include a fixed amount of buffer material 140, or the nozzle may be fluidly connected to a source of buffer material that flows through the volume of the housing 146, exiting the nozzle at the exit end 150 or at another fluid exit port or channel. Where the process is performed along a non-linear process path, the nozzle 144 is swept along the entry surface 120 of the substrate with synchronized motion of the substrate 112 to achieve a constant or otherwise controllable angle β. For instance, the nozzle 144 may be rotated about the central axis A to maintain the desired seal at the entry surface 120 and/or to maintain a right angle between the central axis A and the interface 142 as the substrate is tilted to accommodate the non-linear process path.

Figure 9:
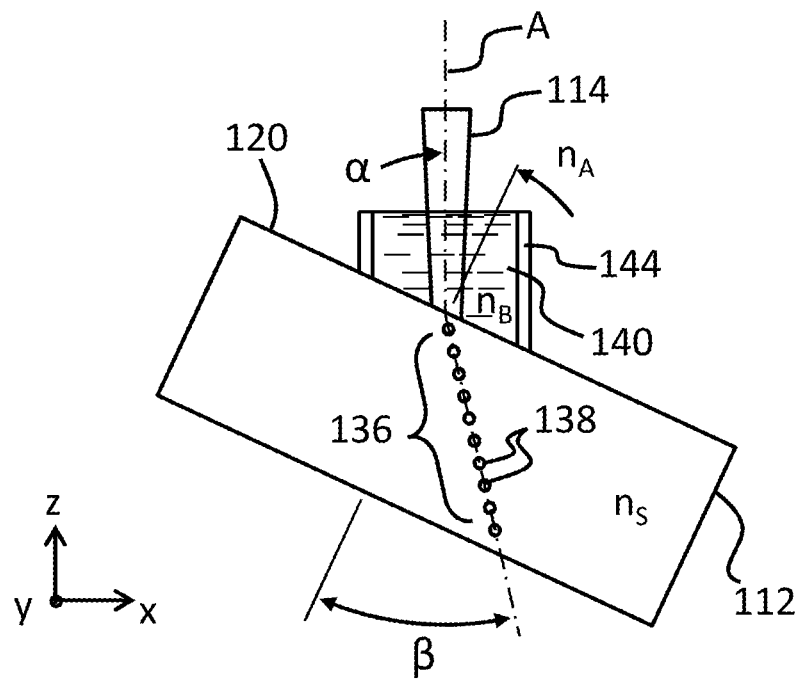
FIG. 9 is a side view of a laser beam impinging a substrate through a buffer material with a refractive index higher than that of the substrate.

FIG. 9 illustrates the configuration of FIG. 8 with the buffer material having a higher index of refraction than the substrate ($n_B>n_S$). While this particular combination may result in more energy losses than one in which the buffer material and the substrate have the same index of refraction, it may still be characterized as having a lower degree of energy loss than with no buffer material. Additionally, laser-induced channels 136 can be produced at an even greater angle β. A high-index buffer material may be used with other nozzle or reservoir arrangements.

Figure 10:
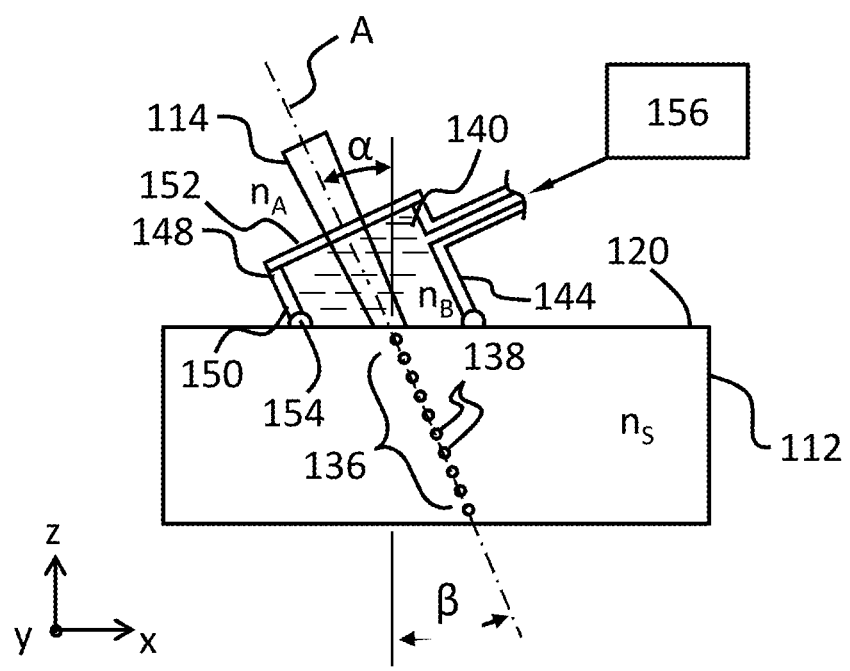
FIG. 10 is a side view of a laser beam impinging a horizontal substrate at an oblique angle through a nozzle containing a buffer material.

FIG. 10 illustrates another example in which a nozzle 144 is employed. In this example, the substrate 112 can be fixed in a horizontal orientation as the laser beam 114 moves along the process path. The laser beam 114 enters the buffer material 140 at an oblique angle to substrate 112, but perpendicular to the buffer material. Here, the nozzle 144 is configured so that gravity does not act to make the top surface of the buffer material horizontal. The nozzle 144 includes an optically transparent window 152 at the entry end 148 and a seal 154 at the exit end 150. The nozzle is thus configured to contain the buffer material 140 without leakage or with controlled leakage along the substrate surface 120. A low friction material such as PTFE or other fluoropolymer may be used for such a seal and/or the housing 146 may be entirely constructed from the seal material. The nozzle 144 may include a fixed amount of buffer material 140, or the nozzle may be fluidly connected to a source 156 of buffer material that flows through the volume of the housing 146, exiting the nozzle at the exit end 150 or at another fluid exit port or channel (not shown). Where the process is performed along a non-linear process path, the nozzle 144 is swept along the entry surface 120 of the substrate with synchronized motion of the laser optics to achieve a constant or otherwise controllable angle β. For instance, the nozzle 144 may be rotated about a vertical axis to maintain the desired angle between the central axis A of the laser beam 112 and the window 152. This embodiment may simplify the laser system machine design, eliminating the need for tilting motion of the substrate.

Figure 11:
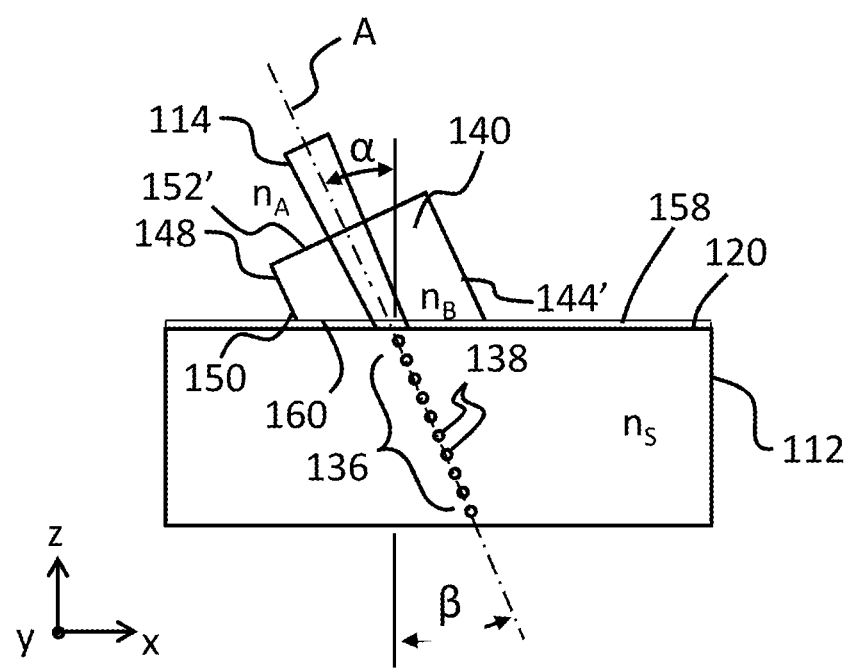
FIG. 11 is a side view of a laser beam impinging a horizontal substrate at an oblique angle through a solid buffer material.

As shown in FIG. 11, it is also possible to employ a solid buffer material 140. In this example, the solid buffer material is in the shape of the previously illustrated nozzles and may be considered a prism 144'. Such a buffer material 140 may be used with a thin film of fluid 158 between the exit end 150 and the entry surface 120 of the substrate 112, for instance. In FIG. 11, the thickness of the thin film of fluid 158 is exaggerated for illustrative purposes. In practice, the film of fluid 158 need only be sufficiently thick to optically couple the prism 144' to the substrate 112—i.e., enough fluid to wet the interface and fill microscopic surface imperfections that may otherwise diffuse light crossing the interface. The fluid 158 may have a refractive index that is the same as or close to the refractive index of the buffer material 140 and/or the substrate 112.

As with the nozzle 144 of FIG. 10, the substrate 112 can be fixed in a horizontal orientation as the laser beam 114 moves along the process path. The laser beam 114 enters the buffer material 140 at an oblique angle to substrate 112, but perpendicular to the buffer material. The prism 144' includes an entry surface 152' at the entry end 148 and an exit surface 160 at the exit end 150. The prism 144' is thus an example of a form of buffer material 140 in which liquid need not necessarily be contained. Though not explicitly illustrated in FIG. 11, the prism 144' may include a fluid channel formed therethrough and extending between the exit surface 160 and some other prism surface. Such a fluid channel may be connected with a fluid source (e.g., similar to the fluid source 156 of FIG. 10) to provide the thin film of fluid 158. Where the process is performed along a non-linear process path, the prism 144' is swept along the entry surface 120 of the substrate with synchronized motion of the laser optics to achieve a constant or otherwise controllable angle β. For instance, the prism 144' may be rotated about a vertical axis to maintain the desired angle between the central axis A of the laser beam 114 and the entry surface 152. Similar to the nozzle of FIG. 10, this embodiment may simplify the laser system machine design by requiring no tilting motion of the substrate. Additionally, the outer edges of the buffer material 140 can extend beyond the edges of the substrate during substrate processing when in the solid form of the prism 144' without loss of buffer material, thereby allowing the process path to be closer to the substrate edges than may be possible with the embodiments of FIGS. 9 and 10.

In one particular embodiment, the buffer material 140 is glass in the form of a prism 144' with the refractive index $n_B$ of the prism glass matching the refractive index $n_S$ of the substrate 112. The thin film of fluid 158 may be water or some other index matching fluid provided via a channel formed through the prism 144' such that the fluid would exits the channel at the exit surface 160 of the prism at the interface between the prism and the substrate keeping the opposing surfaces at that interface wetted.

A variety of products can be produced from a portion of the separated substrate produced by the above-described system and method, particularly where a beveled edge is desired. One such product is a vehicle mirror assembly that includes, among other pieces, a piece of transparent material (e.g., glass) with a reflective coating. Another such product is an electrochromic device that includes at least one piece of transparent material (e.g., glass) and an electrochromic material encapsulated between the transparent material and another piece, the opacity or light transmission properties of the electrochromic material being changeable by an applied voltage. An example of an electrochromic device is an electrochromic vehicle mirror assembly. Construction of vehicle mirror assemblies and electrochromic devices, including electrochromic mirrors, is generally known and is thus not described in detail herein. Further, the types of products that can be made from and benefit from the system and method described above are not limited to these examples of products.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A laser system, comprising:
a laser source configured to produce a pulsed laser beam;
a laser delivery assembly that directs the pulsed laser beam toward a substrate that is at least partially transparent to the laser beam, the laser system being configured to produce a plurality of laser-induced channels extending at least partially through the thickness of the substrate along a process path defined along an entry surface of the substrate; and
a housing positioned to move along the entry surface of the substrate and along the process path, the housing having an entry end and an exit end, and the housing containing a buffer material therein;
wherein the laser beam enters the entry end of the housing, propagates through the buffer material, exits the exit end of the housing, and impinges the substrate with a central axis of the laser beam at an oblique angle of incidence.

2. The laser system of claim 1, wherein the difference between a refractive index of the buffer material and a refractive index of the substrate is less than the difference between the refractive index of the substrate and a refractive index of the atmosphere in which the laser system operates.

3. The laser system of claim 1, wherein the difference between a refractive index of the buffer material and a refractive index of the substrate is less than or equal to 20% of the refractive index of the substrate.

4. The laser system of claim 1, wherein the difference between a refractive index of the buffer material and a refractive index of the substrate is less than or equal to 10% of the refractive index of the substrate.

5. The laser system of claim 1, wherein the difference between a refractive index of the buffer material and a refractive index of the substrate is less than or equal to 5% of the refractive index of the substrate.

6. The laser system of claim 1, wherein a refractive index of the buffer material is equal to a refractive index of the substrate.

7. The laser system of claim 1, wherein a refractive index of the buffer material is greater than a refractive index of the substrate.

8. The laser system of claim 1, wherein the buffer material is a fluid.

9. The laser system of claim 8, wherein the housing is fluidly connected with a fluid source to maintain an amount of the fluid contained in the housing.

10. The laser system of claim 1, wherein the buffer material is a liquid.

11. The laser system of claim 1, further comprising an optically transparent window positioned at the entry end of the housing.

12. The laser system of claim 11, at least one of (i) wherein the exit end of the housing is configured to seal against the entry surface of the substrate or (ii) further comprising a seal positioned at the exit end of the housing to seal the exit end of the housing against the entry surface of the substrate to prevent leakage of the buffer material from the housing when the housing is moved along the entry surface.

13. A laser system, comprising:
a laser source configured to produce a pulsed laser beam;
a laser delivery assembly that directs the pulsed laser beam toward a substrate that is at least partially transparent to the laser beam and has a first surface and an opposing second surface, the laser system being configured to produce a plurality of laser-induced channels extending at least partially through a thickness of the substrate along a process path defined along the first surface; and
a reservoir containing a buffer material, wherein the reservoir is configured to receive the substrate such that the substrate is at least partly immersible in the buffer material where at least a portion of the first surface and the opposing second surface of the substrate are submerged within the buffer material, and wherein the laser beam propagates through the buffer material and impinges the substrate with a central axis of the laser beam at an oblique angle of incidence.

14. A laser system, comprising:
a laser source configured to produce a pulsed laser beam;
a laser delivery assembly that directs the pulsed laser beam toward a substrate that is at least partially transparent to the laser beam, the laser system being configured to produce a plurality of laser-induced channels extending at least partially through the thickness of the substrate along a process path defined along an entry surface of the substrate; and
a prism having an entry end and an exit end, the exit end of the prism positioned to move along the entry surface of the substrate in contact therewith and along the process path;
wherein the prism is a solid buffer material and is optically coupled with the substrate by a thin film of fluid between the exit end of the prism and the entry surface of the substrate; and
wherein the laser beam enters the entry end of the prism, propagates through the solid buffer material of the prism, exits the exit end of the prism, and impinges the substrate with a central axis of the laser beam at an oblique angle of incidence.

15. The laser system of claim 14, wherein the prism comprises a fluid flow channel formed therethrough, the fluid flow channel extending between the exit end of the prism and another different surface of the prism, and wherein the fluid flow channel is fluidly connected with a fluid source to maintain the thin film of fluid between the exit end of the prism and the entry surface of the substrate.

* * * * *